Aug. 28, 1928.

L. S. KLINE 1,682,618

WHEEL ATTACHMENT

Original Filed Aug. 12, 1925   2 Sheets-Sheet 1

Louis S. Kline INVENTOR

BY Victor J. Evans

ATTORNEY

WITNESS:

Aug. 28, 1928.

L. S. KLINE 1,682,618

WHEEL ATTACHMENT

Original Filed Aug. 12, 1925   2 Sheets-Sheet 2

Louis S. Kline  INVENTOR

BY Victor J. Evans  ATTORNEY

Patented Aug. 28, 1928.

1,682,618

UNITED STATES PATENT OFFICE.

LOUIS S. KLINE, OF YOUNGSTOWN, OHIO.

WHEEL ATTACHMENT.

Application filed August 12, 1925, Serial No. 49,806. Renewed March 30, 1928.

This invention relates to a mud lug for vehicle wheels, the general object of the invention being to provide the lug with a base for engaging the tire, means for fastening the base to the wheel and a ground engaging element fastened to the base by tongues.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
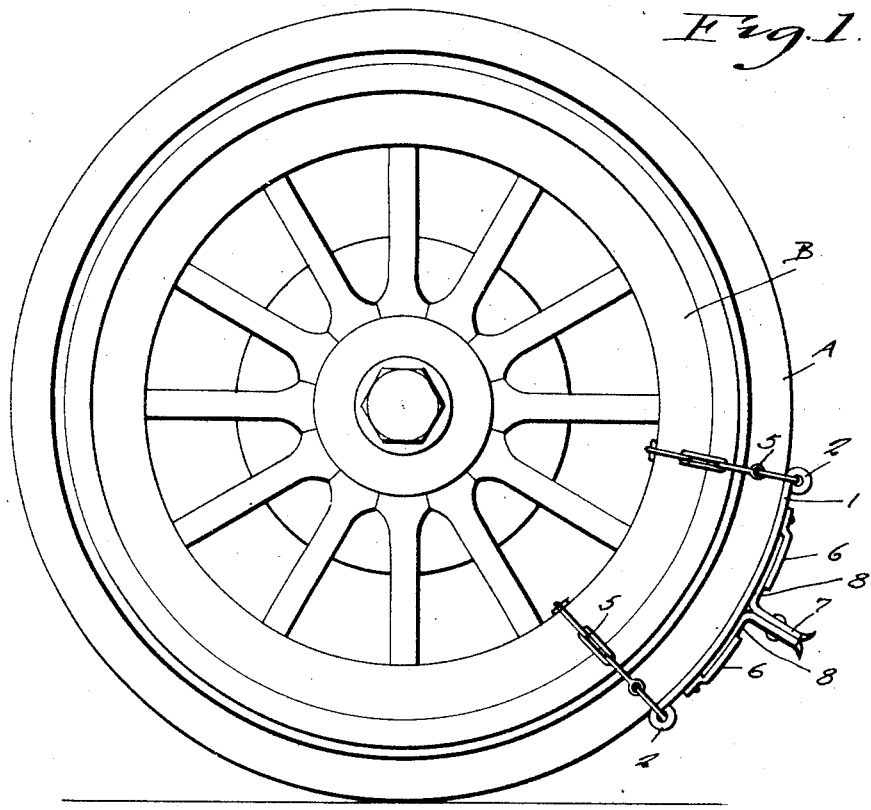
Figure 1 is a view of a wheel showing the invention in use.
Figure 4:
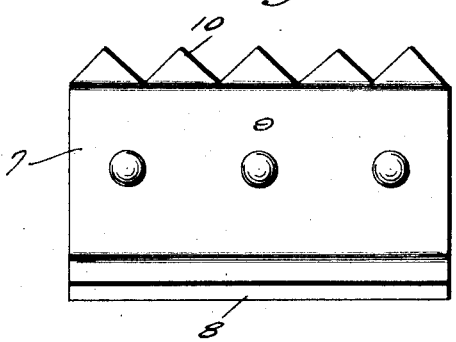
Figures 4 and 5 are views of the ground engaging element.

As shown in these views, the device comprises a base 1 formed of a plate which is curved longitudinally to fit the tread part of a tire, as shown at A in Figure 1. This plate has tapering ends ending in extensions which are rolled to provide the eyes 2. A bar 3 is placed in each eye and each bar has an eye 4 at each end thereof. These eyes 4 receive end links of the fastening chains 5 which are adapted to be placed around the felly of a wheel, such as B, and hooked together to hold the device on the wheel as shown in Figure 1. The plate is provided with tongues 6 which are formed by cutting the material and bending the cut parts so that the tongues are spaced above the body but extend substantially parallel therewith. These tongues form guides and holding means for the ground engaging element 7 which is formed with the curved base 8 and the outwardly extending part 9 which is provided with the teeth 10 at its outer edge. The base 8 is slid under the tongues 6 with the part 9 projecting outwardly from between the tongues. This part 9 extends at an angle, as shown in Figure 1, so that it will properly engage the road surface as it descends under the rotation of the wheel and thus prevents the wheel from slipping in muddy or soft ground. The member 7 can be removed from the base whenever desired. The base can be easily and quickly placed on a wheel and removed therefrom so that it is a simple matter to enable a stalled vehicle to pull itself out of a mud hole or soft place in the ground with a pair of these devices.

Figure 5:
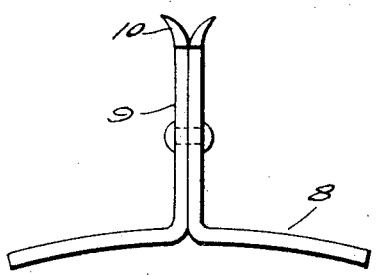
Figure 2:
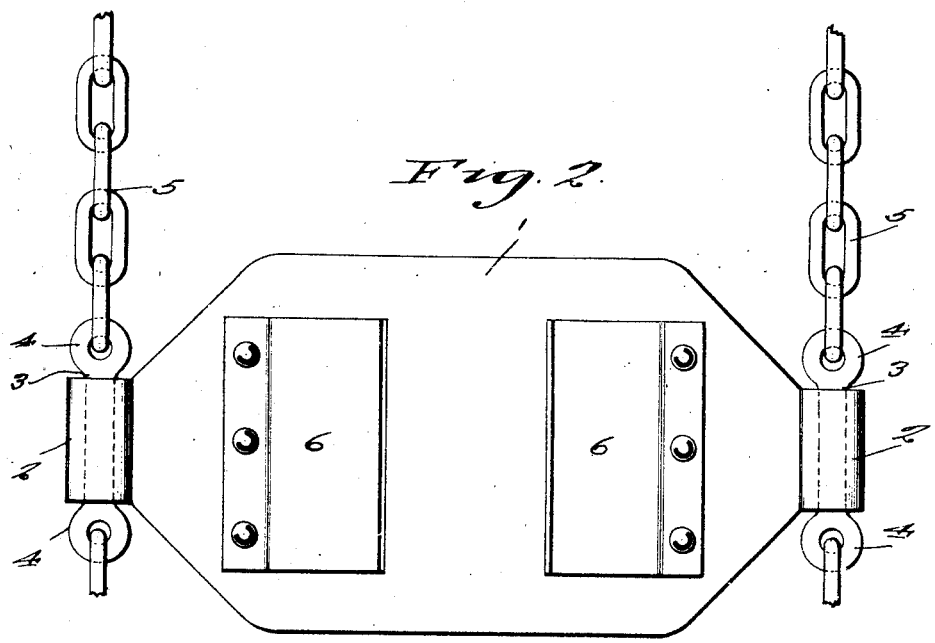
Figure 2 is a plan view of the base of the lug.
Figure 3:
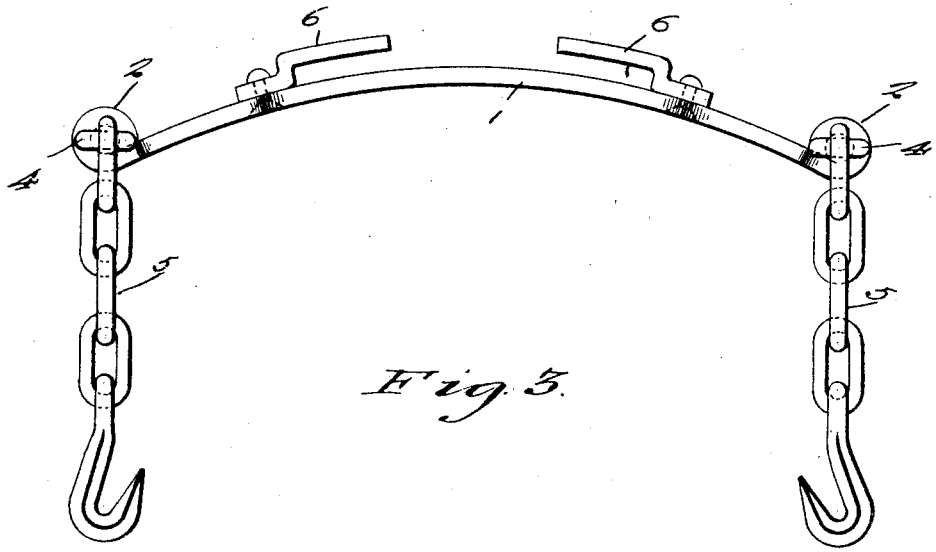
Figure 3 is an edge view of said base.

I prefer to form the member 7 of two angle-shaped plates with their vertical flanges abutting and riveted together to form the part 9. Each flange is provided with the teeth 10 which are curved outwardly, as shown in Figure 5, so that the two sets of teeth form a V-shaped recess. Thus I have provided a ground engaging element which will dig into the road surface and thus give perfect traction no matter what condition the road surface is in.

While the device is mainly intended for trucks, it will, of course, be understood that it can be used on other vehicles with but slight change in the formation of the base.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the character described including a shoe member adapted to conform to the exterior of a pneumatic tire and spaced guides on the outer surface of the shoe, a ground engaging element including a pair of right-angular plates having one side thereof arranged in contacting relation and secured together, the other sides being extended in opposite direction and formed to conform to the curvature of a shoe and adapted to be disposed within said guides, the outer edge of the parallel portions of said plates being notched to form teeth, said teeth curving outwardly with the teeth on one plate curving in a direction opposite that of the teeth on the other plate.

In testimony whereof I affix my signature.

LOUIS S. KLINE.